US009092747B2

(12) United States Patent
Cody et al.

(10) Patent No.: US 9,092,747 B2
(45) Date of Patent: Jul. 28, 2015

(54) STATEMENT OF WORK ANALYSIS AND RESOURCE PARTICIPATION ASSESSMENT

(71) Applicant: International Business Machines Corporation, Armonk, NY (US)

(72) Inventors: Jon L. Cody, Sachse, TX (US); Mark A. Porter, Nederland, CO (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 13/628,435

(22) Filed: Sep. 27, 2012

(65) Prior Publication Data

US 2014/0089022 A1 Mar. 27, 2014

(51) Int. Cl.
*G06Q 10/06* (2012.01)

(52) U.S. Cl.
CPC ............ *G06Q 10/06* (2013.01); *G06Q 10/0637* (2013.01)

(58) Field of Classification Search
CPC .................................................. G06Q 10/0637
USPC ........................................................ 705/7.36
See application file for complete search history.

(56) References Cited

U.S. PATENT DOCUMENTS

| | | | |
|---|---|---|---|
| 6,507,874 B1 * | 1/2003 | Tuniman et al. ............... | 709/247 |
| 8,645,958 B2 * | 2/2014 | Huetter et al. ................ | 718/101 |
| 2003/0046263 A1 * | 3/2003 | Castellanos et al. .............. | 707/1 |
| 2003/0066028 A1 * | 4/2003 | Payne et al. .................... | 715/500 |
| 2004/0205531 A1 | 10/2004 | Innes et al. | |
| 2006/0004596 A1 * | 1/2006 | Caniglia et al. .................... | 705/1 |
| 2009/0106068 A1 | 4/2009 | Bhamidipaty et al. | |
| 2011/0099052 A1 * | 4/2011 | Brun et al. .................... | 705/7.38 |
| 2014/0059415 A1 * | 2/2014 | Bailey, Jon R. ............... | 715/224 |

OTHER PUBLICATIONS

Zhang, Yong. "An Automated Tool for Natural Language Requirement Extraction." A Thesis Submitted to the Faculty of Mississippi State University in Partial Fulfillment of the Requirements for the Degree of Master of Science in Computer Science in the Department of Computer Science. Dec. 1999.*

* cited by examiner

*Primary Examiner* — Susanna M Meinecke Diaz
(74) *Attorney, Agent, or Firm* — Mark Vallone; Keohane & D'Alessandro PLLC; Hunter E. Webb

(57) ABSTRACT

Aspects of the present invention provide an approach for analyzing statements of work (SOWs), and identifying applicable services to offer in response thereto. Among other things, a file may be converted from a first format to a second format, and then utilized to determine a scope of: at least one strategic outsourcing service being requested in the SOW; at least one service delivery tower of the services delivery organization that may have a responsibility for delivering a strategic outsourcing service to the potential client; and/or a set of requirements for the at least one service delivery tower to deliver the at least one strategic outsourcing service. A report identifying at least one of the determined scope, the at least one service delivery tower, and the set of requirements may then be generated.

21 Claims, 25 Drawing Sheets

| | J | A | K | L | M | N | O | P | Q |
|---|---|---|---|---|---|---|---|---|---|
| | | | | | RFP / SOW ANALYSIS | | | | |
| 1 | | APPENDIX A FISMA SECURITY CONT | DOCUMENT NAME | DATE UPDATED | SCOPE | TOWER | TAGS | REQUIREMENT 1 | REQUIR |
| 2 | | | | | | | | | |
| 276 | | | | | | | | | |
| 277 | | | | | | | | | |
| 278 | | | | | | | | | |
| 279 | | | | | | | | | |
| 280 | | | | | | | | | |
| 281 | | | | | | | | | |
| 282 | | | | | | | | | |
| 283 | | | | | | | | | |
| 284 | | | | | | | | | |
| 285 | | | | | | | | | |
| 286 | | | | | | | | | |
| 287 | | | | | | | | | |
| 288 | | | | | | | | | |
| 289 | | | | | | | | | |
| 290 | | | | | | | | | |
| 291 | | | | | | | | | |
| 292 | | APPENDIX A FISMA SECURITY CONT | | | | | | | |
| 293 | | APPENDIX B RUN BOOK EXAMPLE | | | | | | | |
| 294 | | APPENDIX C IRS STORAGE PROGRAM | | | | | | | |
| 295 | | APPENDIX D ITIL FRAMEWORK | | | | | | | |
| 296 | | | | | | | | | |
| 297 | | | | | | | | | |
| 298 | | | | | | | | | |

/ TABLE 13 GFE SAN FABRIC CHARAC / APPENDIX A FISMA SECURITY CONT / APPENDIX B RUN BOOK EXAMPLE ... / FIGURE 1 / FIGURE 2

FIG. 5A

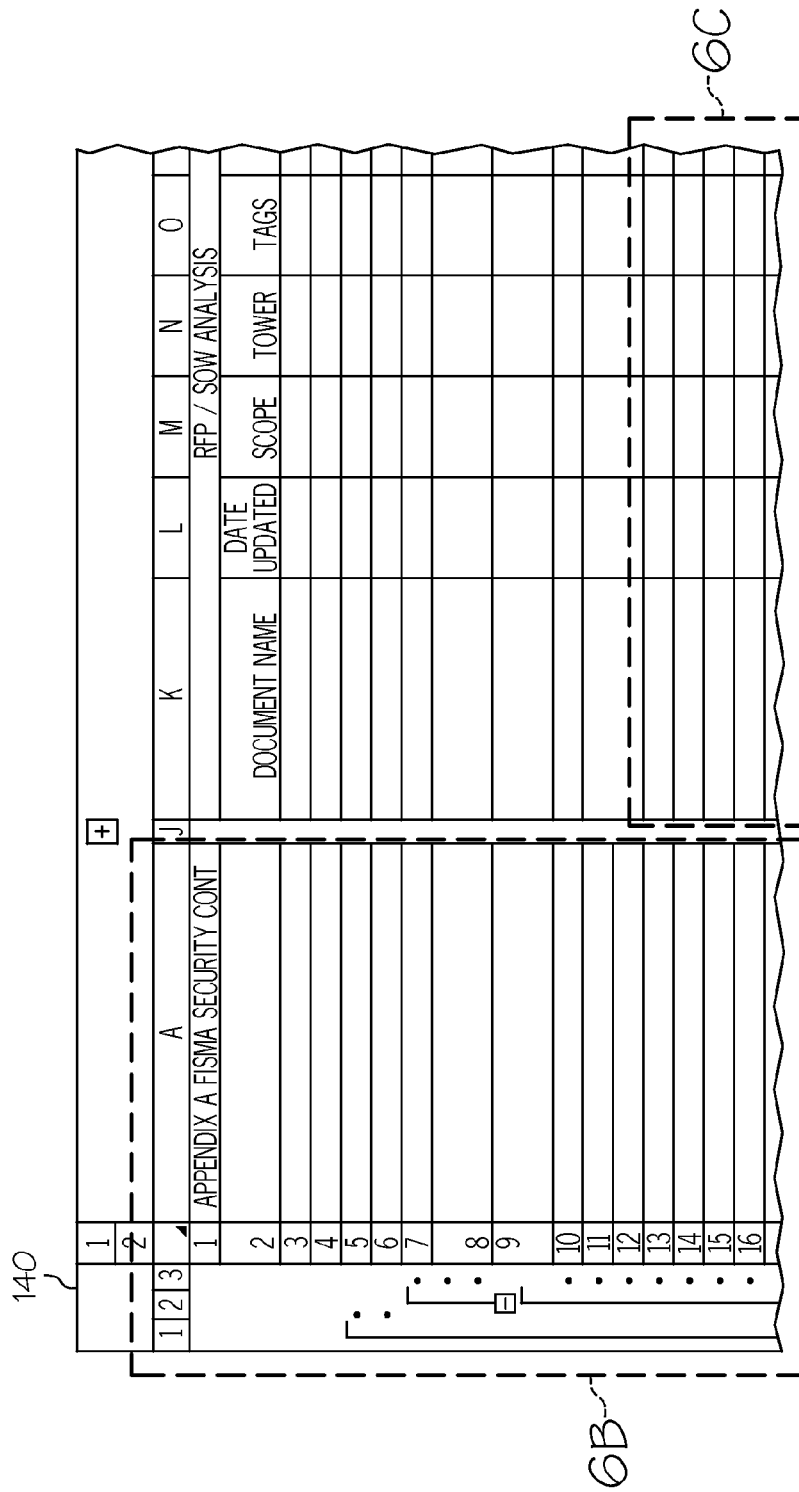

| | | 1 | |
|---|---|---|---|
| | | 2 | |
| 1 | 2 | 3 | |
| | | 1 | |
| | | 2 | |
| | | 3 | [INSERT SUPPLIER NAME] – JJSI, SOW |
| | | 4 | ATTACHMENT 2E |
| | | 5 | SITE SERVICES |
| | | 6 | ARTICLE 1 DEFINITIONS AND INTERPRETATION |
| | | | 1.01 ADDITIONAL DEFINITIONS. UNLESS OTHERWISE D |
| | | 7 | MEANINGS SET FORTH IN EXHIBIT 1. |
| | | | 1.02 REFERENCES. EXCEPT WHERE OTHERWISE INDIC/ |
| | | 8 | ARTICLES OR SECTIONS OF, OR SCHEDULES TO, THIS |
| | | 9 | ARTICLE 2 ITIL PROCESS EXECUTION. |
| | | | 2.01 ASSET INVENTORY AND MANAGEMENT PROCESS |
| | | 10 | PROCESS INCLUDE USING THE ASSET INVENTORY AN |
| | | 11 | (1) VERIFY INVENTORY INFORMATION UPON AN AUTI |
| | | 12 | (2) CONTINUOUSLY UPDATE THE ASSET INVENTORY |
| | | 13 | (a) REMOVING BUYER ASSETS THAT ARE NO LONG |
| | | 14 | (b) MODIFYING BUYER'S ASSET INFORMATION RESL |
| | | 15 | (c) MODIFYING BUYER'S ASSET INFORMATION DUE |
| | | 16 | (d) ADDING NEW ASSET INFORMATION UPON IMPLI |

SOW ANALYZER STRING SEARCH AND ASSOCIATION

FIG. 6B

| ATTACHMENT 2E (SITE SERVICES).DOC | 12-21-2011 14:48 | SCOPE | TOWER | TAGS |
|---|---|---|---|---|
| ATTACHMENT 2E (SITE SERVICES).DOC | 12-21-2011 14:48 | IBM | ASSET | |
| ATTACHMENT 2E (SITE SERVICES).DOC | 12-21-2011 14:48 | IBM | ASSET | |
| | | IBM | ASSET | |

| | | | |
|---|---|---|---|
| 1 | | A | continued to FIG. 7B |
| 2 | | | |
| | 1 | J | |
| | 2 | CUSTOMER RFP / SOW | |
| | 3 | 1. OVERVIEW | |
| | | THIS SERVER HOSTING SERVICE DESCRIPTION SETS FORTH A DESCRIPTION OF SERVICES, THE MAJOR FUNCTIONS, DESIRED SERVICE RESULTS AND CONSTRAINTS; AND IT DEFINES THE RESPONSIBILITIES OF THE PARTIES IN THE EXECUTION OF THESE SERVICES. THESE SERVICES ARE INTENDED TO BE DELIVERED IN A SUPPORTED INFRASTRUCTURE ENVIRONMENT THAT HAS THE CHARACTERISTICS OF A PRIVATE CLOUD OR PUBLIC CLOUD AS MAY BE THE CASE, DEPENDING ON THE BUYER PREFERENCE. THIS SERVICE DESCRIPTION ALSO ADDRESSES THE CASE | |
| | 4 | WHERE SERVICES ARE TO BE DELIVERED AT A BUYER PROVIDED SITE WITH BUYER PROVIDED EQUIPMENT AND SOFTWARE | |
| | | SUPPLIER SHALL PROVIDE DATA PROCESSING INFRASTRUCTURE, INCLUDING FACILITIES, COMPUTER HARDWARE, BASE OPERATING SYSTEM, STORAGE AND NETWORKING CAPABILITIES TO CONNECT TO THE INTERNET OR BUYER PROVIDED WAN. THE ENVIRONMENT ALSO INCLUDES SECURITY SOFTWARE AND INFRASTRUCTURE MONITORING CAPABILITIES AND REPORTING. UNLESS RETAINED BY BUYER, | |
| | 5 | SERVER HOSTING SERVICES WILL BE TRANSITIONED FROM BUYER TO SUPPLIER, AND SHALL INCLUDE: | |
| | | PROVIDING ONE OR MORE DATA CENTERS AND ALL NECESSARY COMPONENTS (I.E., HARDWARE AND SOFTWARE) ON THE SUPPORTED INFRASTRUCTURE ENVIRONMENT AND OTHER RELATED TECHNOLOGIES, INCLUDING THE NECESSARY STORAGE AND BACKUP SYSTEMS, | |
| | 6 | AND OPERATIONAL/SECURITY EVENT REPORTING TO COMPLY WITH THE SERVICE LEVELS; | |
| | | PERFORMING ALL NECESSARY SUPPORTED INFRASTRUCTURE ENVIRONMENT EQUIPMENT AND SOFTWARE INSTALLATION, MAINTENANCE | |
| | 7 | AND REPAIR TO COMPLY WITH THE SERVICE LEVELS; | |
| | | PERFORMING ALL NECESSARY INSTALLATION, MAINTENANCE AND REPAIR OF SUPPORTED INFRASTRUCTURE ENVIRONMENT TO COMPLY WITH SERVICE LEVELS. THE ENVIRONMENT IS TO BE SET UP SUCH THAT THE BUYER CAN CONFIGURE THE ENVIRONMENT TO BE ABLE | |
| | 8 | TO HOST BUYER APPLICATIONS, WHERE POSSIBLE; AND | continued to FIG. 7B |

| DOCUMENT NAME | DATE UPDATED | SCOPE | TOWER | TAGS | REQUIREMENT 1 |
|---|---|---|---|---|---|
| | | RFP / SOW ANALYSIS | | | |
| ATTACH I1- SERVER HOSTING SERVICES. DOCX | 11/11/2011 16:40 | IBM | SERVER | | CLOUD |
| ATTACH I1- SERVER HOSTING SERVICES. DOCX | 11/11/2011 16:40 | IBM | SERVER | | SERVER CONSOLE OPS |
| ATTACH I1- SERVER HOSTING SERVICES. DOCX | 11/11/2011 16:40 | IBM | STORAGE | | SERVICE LEVEL MGMT |
| ATTACH I1- SERVER HOSTING SERVICES. DOCX | 11/11/2011 16:40 | IBM | ACCT MGMT | | SERVICE LEVEL MGMT |
| ATTACH I1- SERVER HOSTING SERVICES. DOCX | 11/11/2011 16:40 | IBM | AMS | | SERVICE LEVEL MGMT |

FIG. 7B

| AREA | SCHEME | SLO/SPECIFICATION | PRIMARY REQUIREMENT | PRIMARY FEATURE | SECONDARY REQUIREMENT | SECONDARY FEATURE |
|---|---|---|---|---|---|---|
| PRIMARY STORAGE | PERFORMANCE | SUSTAINED THROUGHOUT PER ARRAY | 8,000 IOPS | WITH HIGH-END FC/FICON RAID | 8,000 IOPS | |
| | | 5s. PEAK THROUGHPUT PER ARRAY | 800MBps | | 800MBps | |
| | | R/W RATIO | 24,000 IOPS 1.6 GBps 60:40:00 | | 24,000 IOPS 1.6 GBps 60:40:00 | |
| | | AVERAGE RESPONSE TIME | 2-4 ms | | 2-4 ms | |
| | | PEAK RESPONSE TIME | <8ms | | <8ms | |
| | POOLS | THIN PROVISIONING | YES-MIN 125% OF UTILIZED CAPACITY | | YES-MIN 125% OF UTILIZED CAPACITY | |
| | AVAILABILITY | MAXIMUM UNPLANNED | <26.5m | | <26.5m | |

TABLE 1 STORAGE CLASSES / TABLE 2 GOLD STORAGE SERVICE / TABLE 3 SILVER STORAGE SERVICE / TABLE 4 BRONZE 162A    162B    162C

FIG. 8

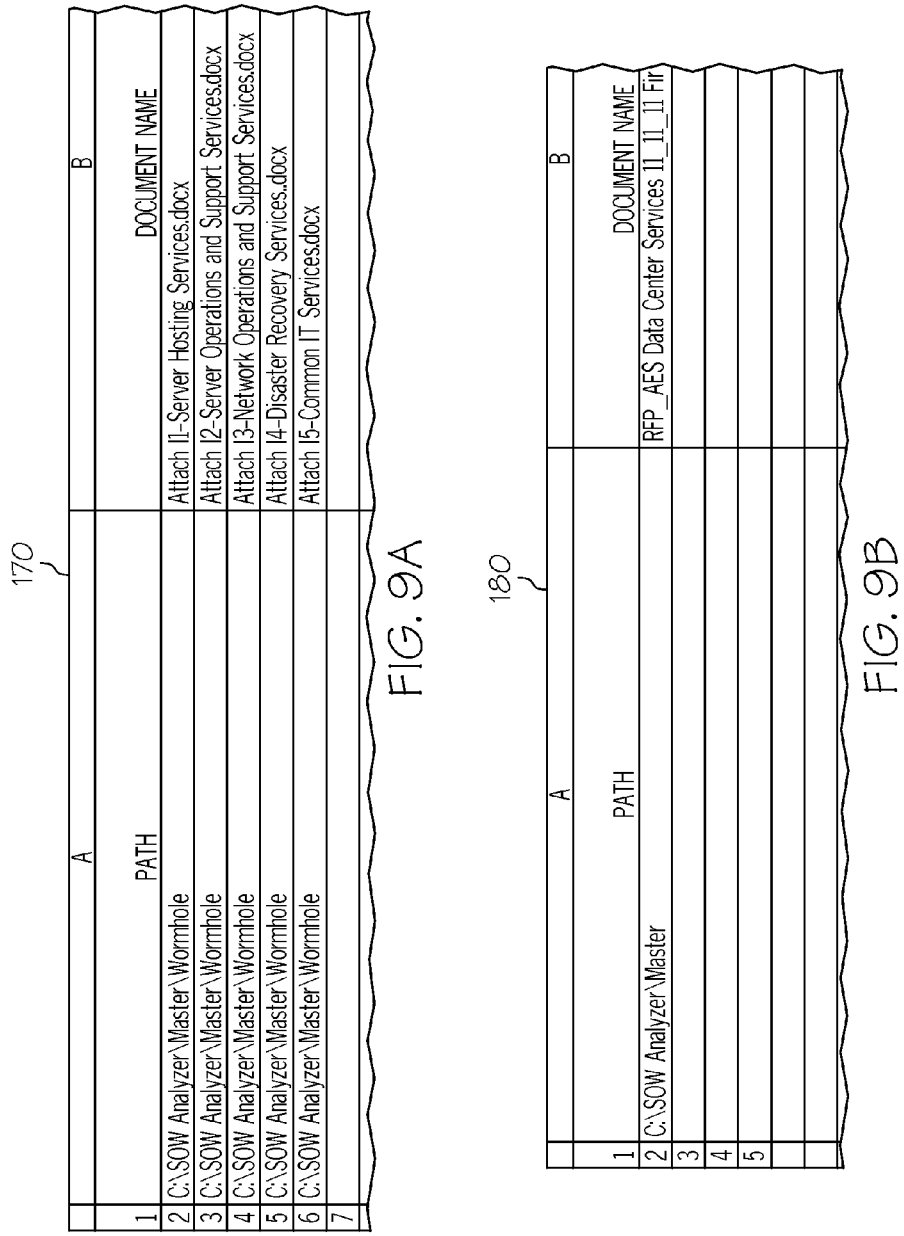

| | A | B | C | D | E | F |
|---|---|---|---|---|---|---|
| 1 | IBM | PARTNER 1 | PARTNER 2 | PARTNER 3 | PARTNER 4 | CUSTOMER |
| 2 | VENDOR WILL | | | | | BUYER'S RESPONSIBILITIES |
| 3 | SUPPLIER SHALL | | | | | BUYER SHALL |
| 4 | SUPPLIERS | | | | | VENDER'S RESPONSIBILITIES |
| 5 | VENDERS | | | | | VENDER SHALL |
| 6 | | | | | | |
| 7 | | | | | | |

FIG. 10  190

| | N | O | P | Q |
|---|---|---|---|---|
| 1 | ENTERPRISE SECURITY MANAGEMENT | CUSTOMER SERVICE CENTER | SPMS | STORAGE MANAGEMENT |
| 12 | VIRUSES | ELECTRONIC TROUBLE TICKET | | MAGNETIC MEDIA |
| 13 | SECURITY ADMINISTRATION | PROBLEM TICKET | | TIERED STORAGE |
| 14 | ANTIVIRUS | PROBLEM MANAGEMENT | | TIERED STORAGE |
| 15 | SECURITY MANAGEMENT | | | STORAGE |
| 16 | | | | STORAGE |
| 17 | | | | |
| 18 | | | | |
| 19 | | | | |
| 20 | | | | |

FIG. 11  200

| | A | B | C | D | E | F |
|---|---|---|---|---|---|---|
| 1 | SCOPE | TOWER | TAGS | REQUIREMENT 1 | REQUIREMENT 2 | REQUIREMENT 3 |
| 2 | IBM | ACCT MGMT | ARCH-CTL | ACCOUNT MGMT | ACCOUNT MGMT | ACCOUNT MGMT |
| 3 | PARTNER 1 | AMS | ASSUMPTION | SERVICE LEVEL MGMT | SERVICE LEVEL MGMT | SERVICE LEVEL MGMT |
| 4 | PARTNER 2 | ASSET | BASELINE | ASSET MGMT | ASSET MGMT | ASSET MGMT |
| 5 | PARTNER 3 | CROSS | CLOUD | CONFIGURATION MGMT | CONFIGURATION MGMT | CONFIGURATION MGMT |
| 6 | PARTNER 4 | DESKSIDE | CURRENT STATE | SERVICE DESK | SERVICE DESK | SERVICE DESK |
| 7 | CUSTOMER | DR | CUST GOALS | END USER ENABLEMENT | END USER ENABLEMENT | END USER ENABLEMENT |
| 8 | UNCLEAR | FACILITIES | FACILITIES/DC | DESKTOP SUPPORT | DESKTOP SUPPORT | DESKTOP SUPPORT |
| 9 | | GROUPWARE | FRM | IMAC | IMAC | IMAC |
| 10 | | ISERIES | FTE | VIP SUPPORT | VIP SUPPORT | VIP SUPPORT |
| 11 | | ISM | ITIL | SPMS | SPMS | SPMS |
| 12 | | MAINFRAME | PRICING | SERVER MGMT | SERVER MGMT | SERVER MGMT |
| 13 | | MIDRANGE | PROJECTS | DB SUBSYSTEM SUPPORT | DB SUBSYSTEM SUPPORT | DB SUBSYSTEM SUPPORT |
| 14 | | NETWORK | PROPOSAL | PHYSICAL DBA | PHYSICAL DBA | PHYSICAL DBA |
| 15 | | PROCUREMENT | TARGET STATE | MIDDLEWARE SUPPORT | MIDDLEWARE SUPPORT | MIDDLEWARE SUPPORT |
| 16 | | SECURITY | TO DO | BATCH OPERATIONS | BATCH OPERATIONS | BATCH OPERATIONS |
| 17 | | SRVC DESK | VALUE ADD | APPLICATION SUPPORT | APPLICATION SUPPORT | APPLICATION SUPPORT |
| 18 | | SPMS | ? FOR CLIENT | MANAGED STORAGE | MANAGED STORAGE | MANAGED STORAGE |
| 19 | | STORAGE | ? FOR IBM | MEDIA MGMT | MEDIA MGMT | MEDIA MGMT |
| 20 | | T&T | | NETWORK SERVICES | NETWORK SERVICES | NETWORK SERVICES |
| 21 | | | | SECURITY | SECURITY | SECURITY |
| 22 | | | | IDENTITY AND ACCESS | IDENTITY AND ACCESS | IDENTITY AND ACCESS |
| 23 | | | | DR | DR | DR |
| 24 | | | | EVENT MONITORING | EVENT MONITORING | EVENT MONITORING |
| 25 | | | | CAPACITY/PERFORMANCE | CAPACITY/PERFORMANCE | CAPACITY/PERFORMANCE |
| 26 | | | | METERING/CHARGEBACK | METERING/CHARGEBACK | METERING/CHARGEBACK |
| 27 | | | | INCIDENT, PROBLEM, CHANGE | INCIDENT, PROBLEM, CHANGE | INCIDENT, PROBLEM, CHANGE |
| 28 | | | | INTEGRATION/REPORTING | INTEGRATION/REPORTING | INTEGRATION/REPORTING |
| 29 | | | | TRANSITION | TRANSITION | TRANSITION |
| 30 | | | | TRANSFORMATION | TRANSFORMATION | TRANSFORMATION |
| 31 | | | | OTHER | OTHER | OTHER |

FIG. 12

STATEMENT OF WORK ANALYSIS AND RESOURCE PARTICIPATION ASSESSMENT

TECHNICAL FIELD

Aspects of the present invention relate to statement of work (SOW) analysis. Specifically, the present invention relates to the analysis of SOWs and matching to corresponding service offerings in a service delivery organization.

BACKGROUND

Information technology (IT) strategic outsourcing request for proposal (RFP) and request for submission (RFS) processes often require that a potential client provide a detailed statement of work (SOW). Typically, the SOW that is submitted will identify service responsibilities on which service delivery organizations (SDOs) are to bid. Each SOW submission generally results in many hours of personnel time being expended toward reading, reviewing, and analyzing the various sections thereof. This analysis work is performed in an effort to further understand the requirements documented in the potential client's SOW and the services being requested.

Traditionally, engagement personnel may read through the documentation and manually record references found within the SOW that are related to SOW scope being requested within the bid submission. Based on these review findings, and through collaboration with other engagement personnel assigned to study the bid submission, recommendations in the engagement would be made. However, processes requiring lengthy periods of detailed manual analyses and reviews of RFS and RFP bid submission documentation only serve to increase the time needed to identify applicable services. This, in turn, creates potential delays in downstream engagement team activities and potentially leads to condensed engagement project time lines.

SUMMARY

In general, embodiments of the present invention provide an approach for analyzing statements of work (SOWs), and identifying applicable services to offer in response thereto. In a typical embodiment, an input identifying a file will be received. The file may be in a first format (e.g., document) and may include a SOW of a potential client of a services delivery organization. The file may then be converted into a second format (e.g., spreadsheet/workbook). The converted file may then be used to determine: a scope of at least one strategic outsourcing service being requested in the SOW; at least one service delivery tower of the services delivery organization that may have a responsibility for delivering the at least one strategic outsourcing service to the potential client; and/or a set of requirements for the at least one service delivery tower to deliver the at least one strategic outsourcing service. A report identifying at least one of the determined scope, the at least one service delivery tower, and the set of requirements may then be generated.

A first aspect of the present invention provides a computer-implemented method for analyzing statements of work (SOWs). The computer-implemented method includes at least one computer converting a file from a first format into a second format, the file comprising a SOW of a potential client of a services delivery organization. The computer-implemented method further includes the at least one computer determining, using the converted file, a scope of at least one strategic outsourcing service being requested in the SOW. The computer-implemented method further includes the at least one computer determining, using the converted file, at least one service delivery tower of the services delivery organization that may have a responsibility for delivering the at least one strategic outsourcing service to the potential client. The computer-implemented method further includes the at least one computer determining, using the converted file, a set of requirements for the at least one service delivery tower to deliver the at least one strategic outsourcing service. The computer-implemented method further includes the at least one computer generating a report identifying at least one of: the scope, the at least one service delivery tower, and the set of requirements.

A second aspect of the present invention provides a system for analyzing statements of work (SOWs). The system includes a bus, a computer-readable storage device coupled to the bus, and a processor coupled to the bus. The system further includes program instructions, stored on the computer-readable storage device for execution by the processor, program instructions, stored on the computer-readable storage device for execution by the processor, to convert a file from a first format into a second format, the file comprising a SOW of a potential client of a services delivery organization. The system further includes program instructions, stored on the computer-readable storage device for execution by the processor, to determine, using the converted file, a scope of at least one strategic outsourcing service being requested in the SOW. The system further includes program instructions, stored on the computer-readable storage device for execution by the processor, to determine, using the converted file, at least one service delivery tower of the services delivery organization that may have a responsibility for delivering the at least one strategic outsourcing service to the potential client. The system further includes program instructions, stored on the computer-readable storage device for execution by the processor, to determine, using the converted file, a set of requirements for the at least one service delivery tower to deliver the at least one strategic outsourcing service. The system includes program instructions, stored on the computer-readable storage device for execution by the processor, to generate a report identifying at least one of: the scope, the at least one service delivery tower, and the set of requirements.

A third aspect of the present invention provides a computer program product for analyzing statements of work (SOWs). The computer program product includes a computer-readable storage device. The computer program product further includes program instructions, stored on the computer-readable storage device for execution by a processor, to convert a file from a first format into a second format, the file comprising a SOW of a potential client of a services delivery organization. The computer program product further includes program instructions, stored on the computer-readable storage device for execution by the processor, to determine, using the converted file, a scope of at least one strategic outsourcing service being requested in the SOW. The computer program product further includes program instructions, stored on the computer-readable storage device for execution by the processor, to determine, using the converted file, at least one service delivery tower of the services delivery organization that may have a responsibility for delivering the at least one strategic outsourcing service to the potential client. The computer program product further includes program instructions, stored on the computer-readable storage device for execution by the processor, to determine, using the converted file, a set of requirements for the at least one service delivery tower to deliver the at least one strategic outsourcing service. The computer program product further includes program instructions, stored on the computer-readable storage device for execution by the processor, to generate a report identifying at least one of: the scope, the at least one service delivery tower, and the set of requirements.

A fourth aspect of the present invention provides a method for deploying a system for analyzing statements of work (SOWs). The method includes a computer system providing a computer infrastructure being operable to convert a file from a first format into a second format, the file comprising a SOW of a potential client of a services delivery organization. The method further includes the computer infrastructure being further operable to determine, using the converted file, a scope of at least one strategic outsourcing service being requested in the SOW. The method further includes the computer infrastructure being further operable to determine, using the converted file, at least one service delivery tower of the services delivery organization that may have a responsibility for delivering the at least one strategic outsourcing service to the potential client. The method further includes the computer infrastructure being further operable to determine, using the converted file, a set of requirements for the at least one service delivery tower to deliver the at least one strategic outsourcing service. The method further includes the computer infrastructure being further operable to generate a report identifying at least one of: the scope, the at least one service delivery tower, and the set of requirements.

BRIEF DESCRIPTION OF THE DRAWINGS

These and other features of this invention will be more readily understood from the following detailed description of the various aspects of the invention taken in conjunction with the accompanying drawings in which:

FIGS. 5A-C depict an output table worksheet according to an embodiment of the present invention.

FIGS. 6A-C depict another output table worksheet according to an embodiment of the present invention.

FIGS. 7A-B depicts another output table worksheet according to an embodiment of the present invention.

FIG. 8 depicts a tab-based table worksheet according to an embodiment of the present invention.

FIG. 9A depicts a wormhole files table worksheet according to an embodiment of the present invention.

FIG. 9B depicts a non-wormhole files table worksheet according to an embodiment of the present invention.

FIG. 10 depicts a scope table worksheet according to an embodiment of the present invention.

FIG. 11 depicts a tower table worksheet according to an embodiment of the present invention.

FIG. 12 depicts a requirements table worksheet according to an embodiment of the present invention.

Figure 1:
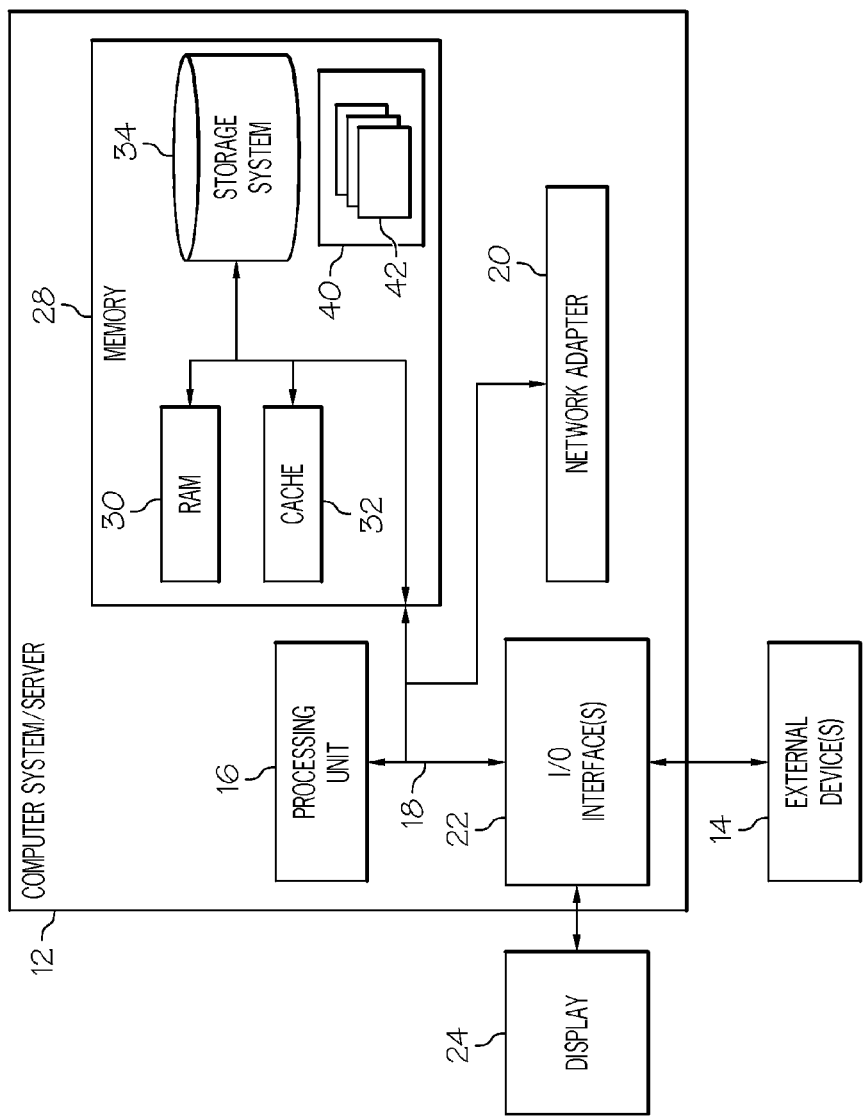
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for analyzing statements of work (SOWs), and identifying applicable services to offer in response thereto. In a typical embodiment, an input identifying a file will be received. The file may be in a first (e.g., document) format and may include a SOW of a potential client of a services delivery organization (SDO). The file may then be converted into a second (e.g., spreadsheet/workbook) format. The converted file may then be used to determine: a scope of at least one strategic outsourcing service being requested in the SOW; at least one service delivery tower of the services delivery organization that may have a responsibility for delivering the at least one strategic outsourcing service to the potential client; and/or a set of requirements for the at least one service delivery tower (e.g., a group or division of the SDO) to deliver the at least one strategic outsourcing service. A report identifying at least one of: the determined scope, the at least one service delivery tower, and the set of requirements may then be generated.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin potential clients, thick potential clients, hand-held or laptop devices, mobile devices, global positioning systems (GPS), GPS-enabled devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each such media component can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. In general, program/utility 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
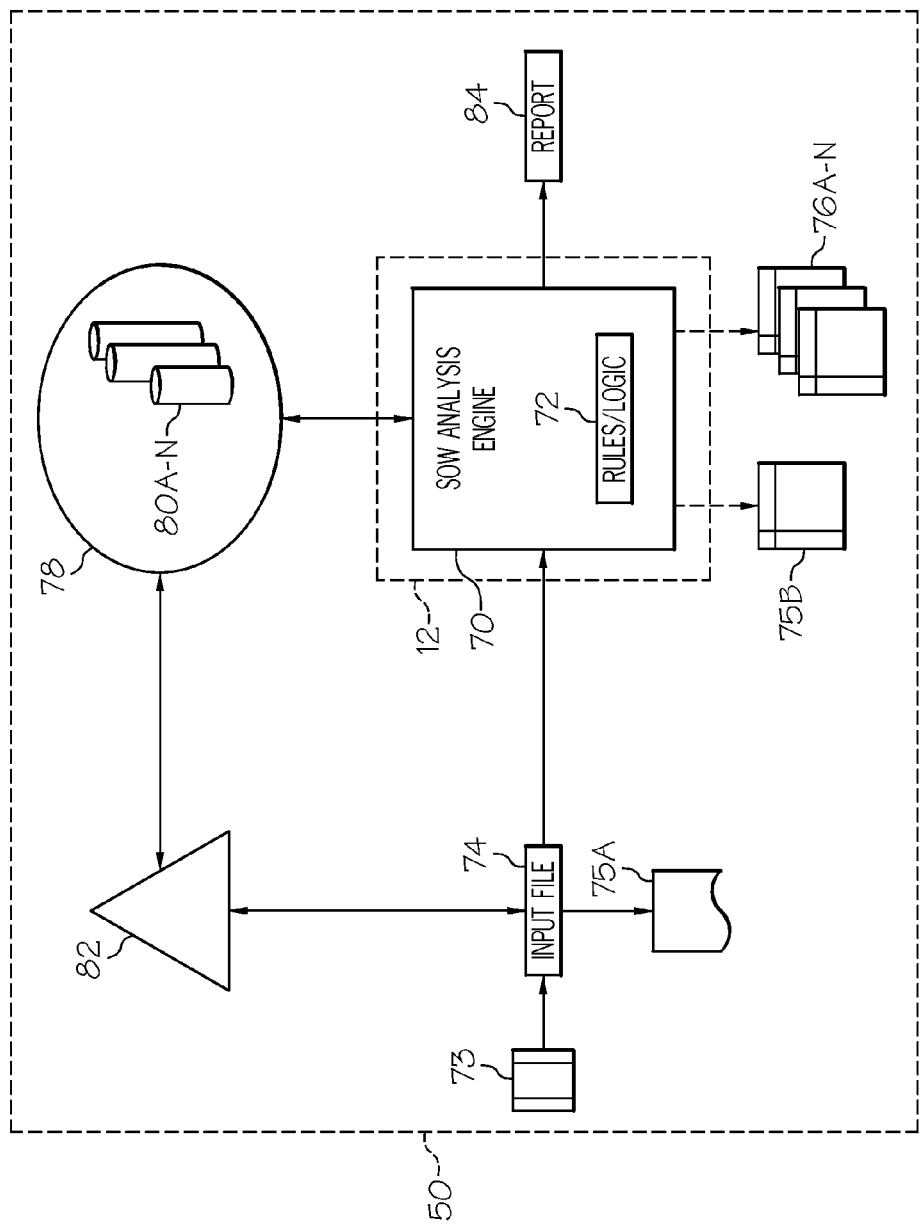
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment 50 (e.g., a cloud computing environment). A computer system/server 12, which can be implemented as either a stand-alone computer system, or as a networked computer system, is shown in FIG. 2. In the event the teachings recited herein are practiced in a networked computing environment 50, each potential client need not have a SOW analysis engine (engine 70). Rather, engine 70 could be loaded on a server (e.g., an SOW analysis server) or server-capable device that communicates (e.g., wirelessly) with the potential clients to provide SOW analysis functionality hereunder. Regardless, as depicted, engine 70 is shown within computer system/server 12. In general, engine 70 can be implemented as program/utility 40 on computer system/server 12 of FIG. 1 and can enable the functions recited herein. As further shown, engine 70 (in one embodiment) comprises a rules and/or computational engine that processes a set (at least one) of rules/logic 72 and/or provides SOW analysis functionality hereunder.

Along these lines, engine 70 may perform multiple functions similar to a general-purpose computer. Specifically, among other functions, engine 70 may (among other things): receive an input identifying a file 74 (or receive an input file 74), the file 74 being in a first format 75A (e.g., a spreadsheet or workbook format) and comprising a SOW 73 (e.g. based on a RFP, RFS, etc.) of a potential client 82 of a services delivery organization (SDO) 78; analyze the file 74 section by section (e.g., paragraph by paragraph); convert the file from the first format 75A into a second format 75B; determine, using the converted file 75B, a scope of at least one strategic outsourcing service being requested in the SOW 73; determine, using the converted file 75B, at least one service delivery tower 80A-N (e.g., group, division, etc.) of the SDO 78 that may have a responsibility for delivering the at least one strategic outsourcing service to the potential client 82; determine, using the converted file 75B, a set of requirements for the at least one service delivery tower 80A-N to deliver the at least one strategic outsourcing service; determine, based on the scope and the requirements, a best match between a set of services offered via the at least one service delivery tower 80A-N and the SOW 73; and/or generate a report 84 (e.g., a worksheet or the like based on one or more tables/worksheets 76A-N generated by engine 70) identifying at least one of: the scope, the at least one service delivery tower 80A-N, the set of requirements, and/or the set of services.

Illustrative Examples

As indicated above, aspects of the present invention provide an approach to automatically process and organize a potential client's SOW (e.g., section by section, such as paragraph by paragraph) into a standard output format. Aspects of the present invention further automatically identify service organizations and service delivery towers/groups that will play a role in engagement solution development and subsequent delivery of a resulting contract (e.g., for requested services). These aspects allow SOW documentation to be quickly analyzed and for service towers to be identified for participation in an engagement. It is understood that although in an illustrative embodiment, the file formats discussed herein are in a document format such as Microsoft Word® and/or a spreadsheet or worksheet format such as Microsoft Excel®, this need not be the case. Rather, the aspects discussed herein could be applied to any types of file formats. Microsoft, Word, Excel, and related terms are trademarks of Microsoft, Inc. in the United States and other countries. In addition, the aspects described herein may leverage "Visual Basic for Applications" Excel and Word macros, as well as logic features contained within the Excel product.

In any event, a typical flow of the engagement business process may be to receive RFPs from potential clients, analyze the RFPs, and decide to bid or not bid the RFPs. If a RFP is bid upon, engagement personnel may be assigned to develop a solution, and then present the solution to the potential client for acceptance, and win the bid. In summary, engine 70 will: convert the file from a first format to a second format; determine SOW scope; perform a tower analysis; and perform a requirements analysis. Each such operation may result in engine 70 updating a results worksheet that may be provided to the potential client. Moreover, upon completion of the main process flow, a user may have available an analysis of the selected SOW documents in a format that shows the scope and resource participation assessment references for use in identifying delivery services and the towers that will be needed to participate in the engagement and solution development.

Along these lines, the following definitions describe some of the functions performed by the analyses referenced above.

Scope Analysis: In embodiments in which engine 70 is implemented as program/utility 40 on computer system/server 12 of FIG. 1, the scope analysis can be implemented as one of program modules 42. The scope analysis is an automated process that occurs following the document conversion into spreadsheet format. The scope analysis process then parses paragraph by paragraph through the converted spreadsheet-based potential client-provided SOW content looking for string text matches in an effort to identify which services described in the potential client-provided SOW are to be performed by the service provider and which services will be retained and provided by the potential client. The process may reference a table of textual scope responsibility related terms which are commonly found in potential client-provided SOWs and RFPs. If through string match, the process finds that a paragraph contains one of the scope responsibility related terms, then the process designates that paragraph within the spreadsheet as either a service provider or potential client responsibility in resulting output. Examples of scope responsibility related terms include "supplier shall" and "buyer shall" respectively. Examples of designated terms indicative of actions to be performed in accordance with a responsibility include "perform" and "approve" respectively.

Tower Analysis: In embodiments in which engine 70 is implemented as program/utility 40 on computer system/server 12 of FIG. 1, the tower analysis can be implemented as one of program modules 42. The tower analysis is an automated process that occurs following the scope analysis process. Similar to the scope analysis, the tower analysis process parses paragraph by paragraph through the converted spreadsheet-based, potential client-provided SOW content looking for string text matches in an effort to identify which services described in the potential client-provided SOW are specific to particular service provider designated specialist groups (e.g., such as server support, end user support, and physical database support). This process references a table of textual tower specific related terms that are commonly found in potential client-provided SOWs and RFPs. If through string match, the process finds that a paragraph contains one of the tower specific related terms, then the process designates that paragraph within the spreadsheet as falling under the related tower. Examples of tower specific related terms include "operating system patches," "end user devices," and "database administration," respectively. Examples of designated terms indicative of tower-based responsibilities include "server systems management," "distributed potential client services," and "physical database," respectively. The process may designate a paragraph as falling under a tower if during the process's analysis of the paragraph, the process marks the paragraph as being within the service provider's scope. The process may ignore and bypass paragraphs designated as being within the potential client's scope.

Requirements Analysis: In embodiments in which engine 70 is implemented as program/utility 40 on computer system/server 12 of FIG. 1, the requirements analysis can be implemented as one of program modules 42. The requirements analysis is an automated process that occurs following the tower analysis process. Similar to the two analyses described above, the requirements analysis process effectively reads paragraph by paragraph through the converted SOW looking for string text matches in an effort to identify which ancillary services described in the potential client-provided SOW are specific to a particular service task responsibility (e.g., such as server UNIX platform support, end user IMAC support, and SQL physical database support). The process then references a table of textual requirements-specific related terms that are commonly found in potential client-provided SOWs and RFPs. If through string match, the process finds that a paragraph contains one of the requirements-specific reference terms, then the process designates that paragraph as falling under the related requirements designation. Examples of requirements-specific reference terms include "UNIX," "IMAC," and "SQL". Examples of designated terms indicative of requirement-based responsibilities include "server platform support," "IMAC coordination," and "physical database" respectively. The process may designate a paragraph as falling under a requirements designation if during the process's analysis of the paragraph, the process marks/indicates the paragraph as being within the service provider's scope. The process may ignore and bypass paragraphs designated as being within the potential client's scope.

Figure 3:
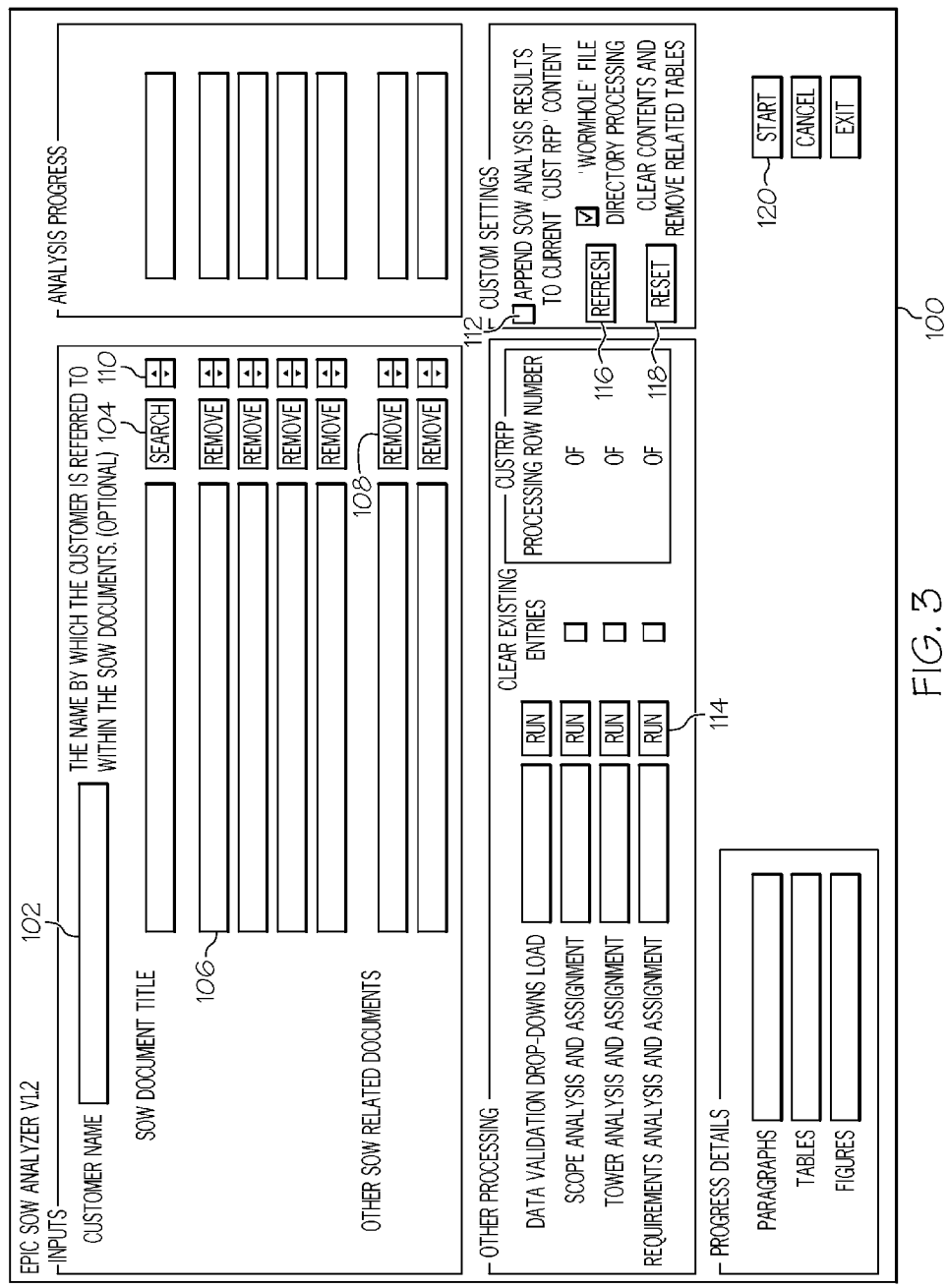
FIG. 3 depicts a user interface according to an embodiment of the present invention.

In general, engine 70 may provide one or more user interfaces by which files containing documents (e.g., SOWs, etc.) may be designated and/or processed. FIG. 3 refers to a user interface (and settings panel) 100 through which a user may select specific SOW documents and through which the user may initiate analysis processing in accordance with the illustrative embodiments. As depicted, interface 100 comprises various features such as (among others): a potential client name field 102 for providing a particular potential client's name, a file directory search mechanism 104 for allowing a file directory to be browsed and an input file to be selected, an internal file title field 106 for providing a name of a particular SOW or project, a file removal mechanism 108 for removing a file added via search mechanism 104 (e.g., inadvertently), a file order changing mechanism 110 for changing the order in which input files are analyzed, an analysis appending mechanism 112 for allowing results of the SOW analysis performed hereunder to be appended to a potential client's SOW/input document, an analysis execution mechanism 114 for commencing individual analyses of designated input files, a refreshing mechanism 116 for refreshing interface 100, a content reset and table removal mechanism 118 for clearing interface 100 and removing any selections and/or designations, and a start button 120 to commence processing of identified files. In general, interface 100 allows a user to designate files (e.g., SOW files) and/or other criteria for processing hereunder.

Figure 4:
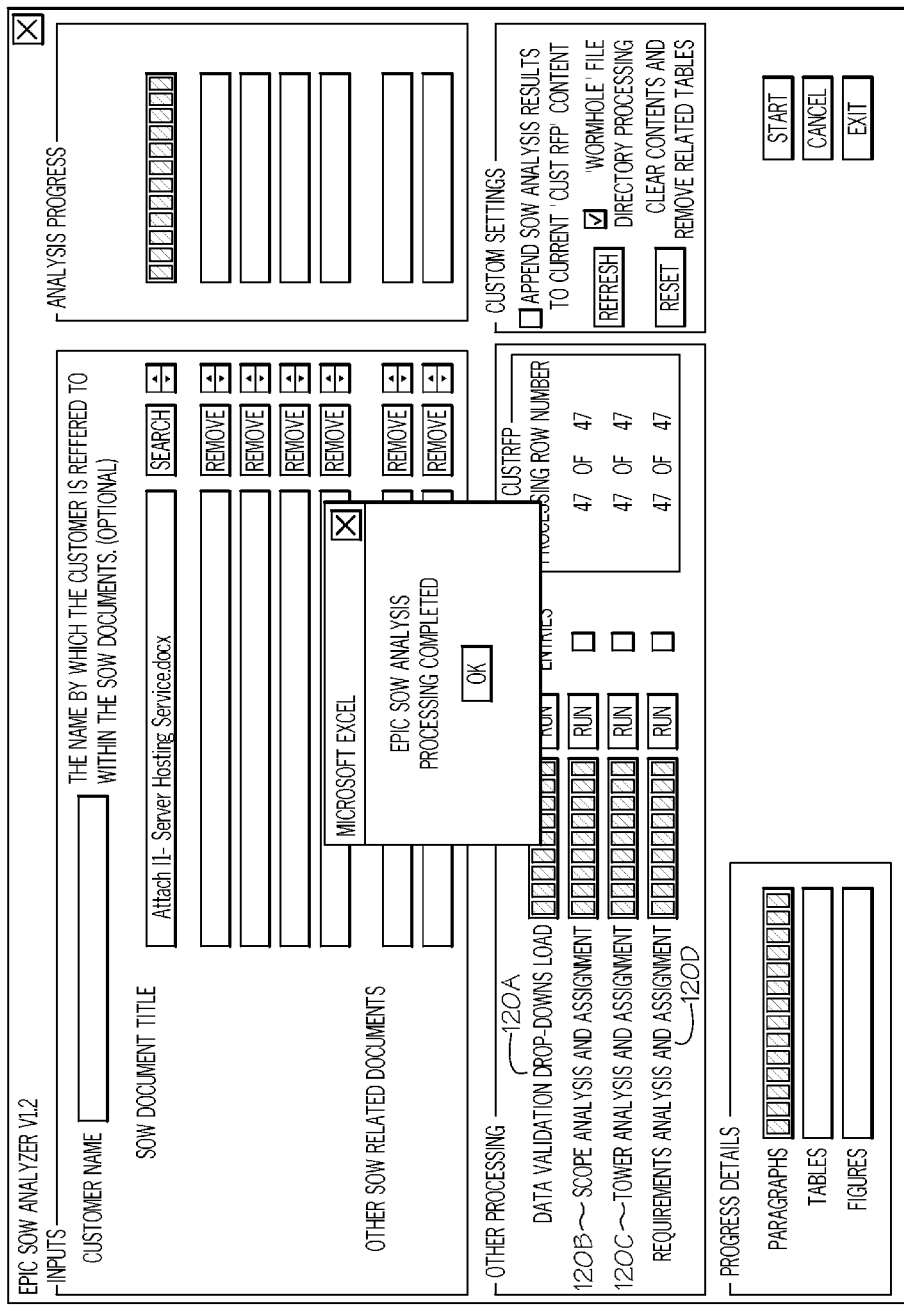
FIG. 4 depicts another user interface according to an embodiment of the present invention.

FIG. 4 depicts interface 100 when at least one of status bars 120A-D are activated. As shown, interface 100 may include a data validation drop-down load status indicator 120A, a scope analysis and assignment indicator 120B, a tower analysis and assignment indicator 120C, and a requirements analysis and assignment indicator 120D. In general, indicators 120A-D allow a user to view the progress of each stage of an SOW analysis process performed by engine 70. That is: data validation drop-down status indicator 120A shows the progress in uploading designated input files performed by engine 70; scope analysis and assignment indicator 120B shows the progress of the scope analysis performed by engine 70; tower analysis and assignment indicator 120C shows the progress of the tower analysis performed by engine 70; and requirements analysis and assignment indicator 120D shows the progress of the requirements analysis performed by engine 70.

As part of a SOW analysis such as that outlined above, an analysis macro, which may be included in a computer program stored in memory 28, may read through rows of worksheets (e.g., within a workbook generated for a set of SOW documents) looking for any rows that start with a numeric value (e.g., 5.01). Then, if found, the analysis macro may read through a worksheet entitled "Table—Scope" (e.g., scope table 190) and look for string-content matches. Responsive to finding a match, the macro may then assign scope "ownership" to a particular potential client/entity using the corresponding "Table—Scope" column header. The macro may then continue to assign that same scope ownership to each row following the numeric row (e.g., 5.0.1) until the next numeric row is found. This process may occur for each row in a customer worksheet. This approach provides a way for an administrator of a template to simply add, update, and/or remove data from the tables. If the analysis macro finds a column header in a worksheet called "Table—Validations" that matches any column header in the worksheet, then the macro (or another macro) may create a data validation list containing all the entries found for that matching column header. This process may occur for each column header in the worksheet. By applying this approach, an administrator for the template may simply add, update, and/or remove validation lists by editing the "Table—Validations" worksheet listings.

Figure 5B:
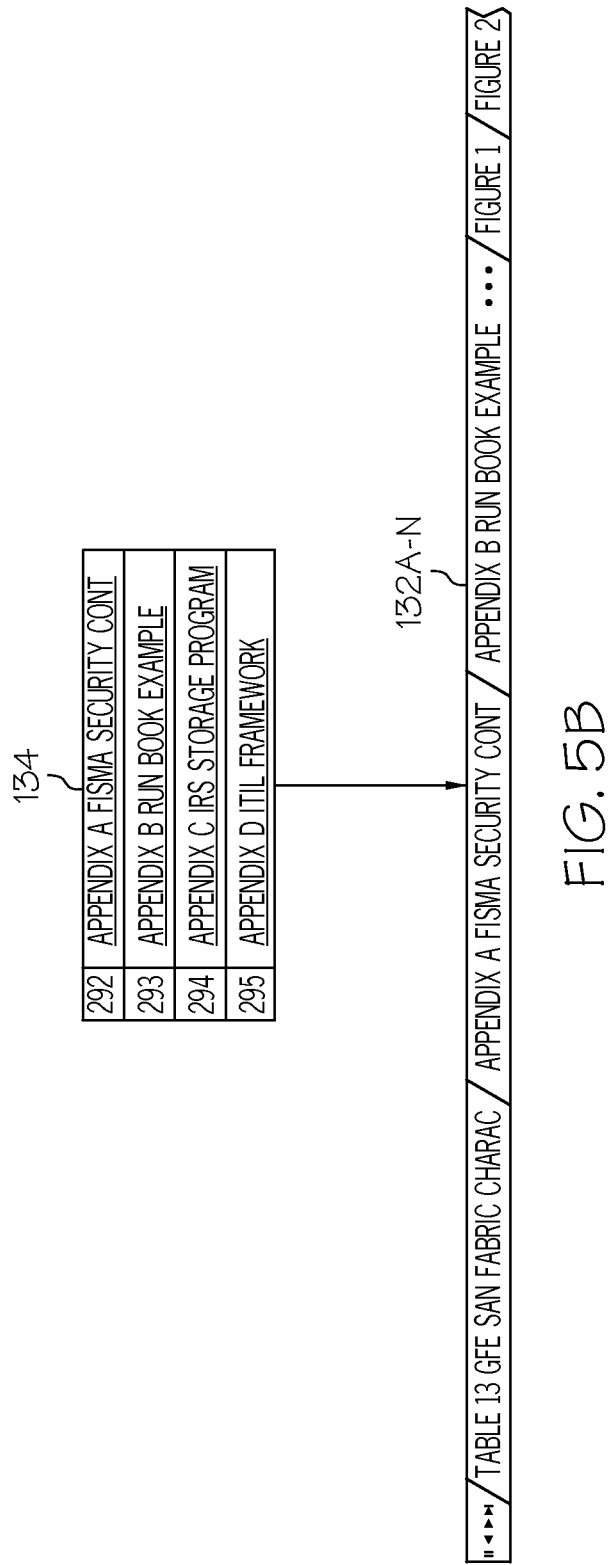
Figure 5C:
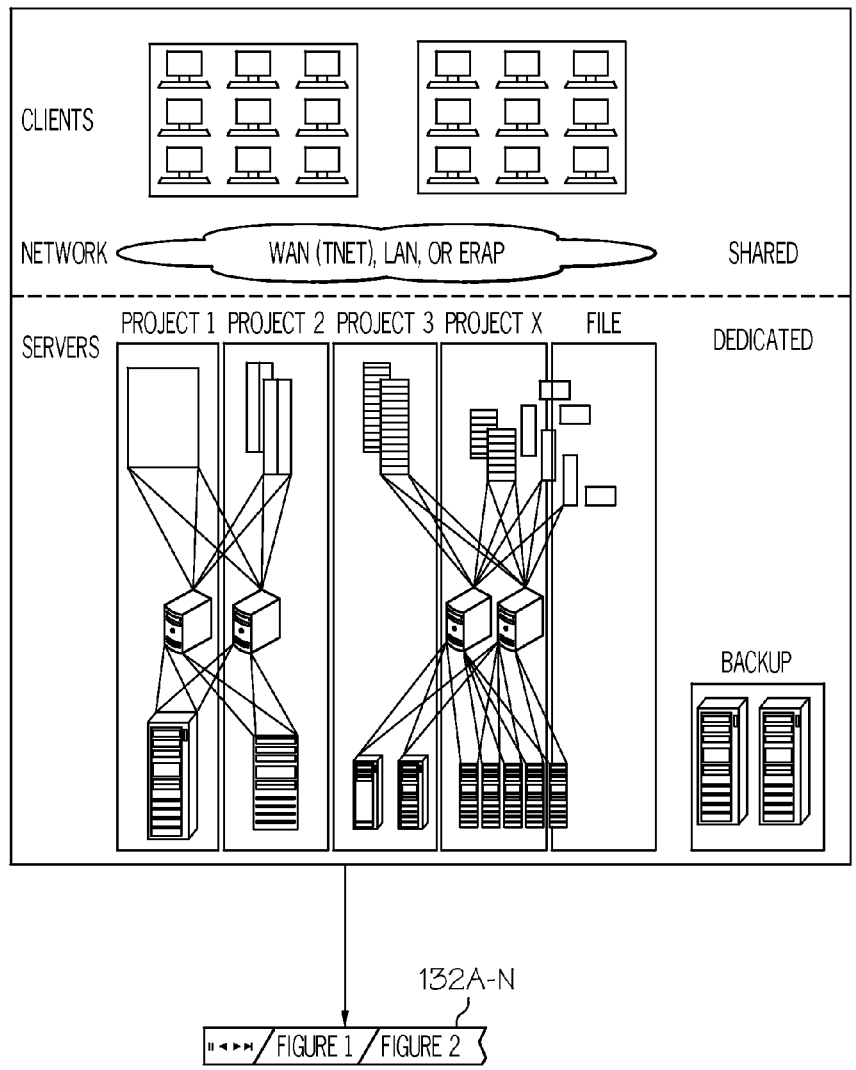

In performing the analyses hereunder, engine 70 may convert the format of files identified via interface 100 from a first (e.g., a document or MS Word) format into a second (e.g., table spreadsheet/workbook or MS Excel) format. FIGS. 5-8 depict illustrative output table worksheets 130, 140, 150, and 160, respectively, resulting for this format conversion and subsequent scope, tower and/or requirements analyses. As shown in FIGS. 5A-C, a set of tabs 132A-N may be utilized to more specifically delineate certain columns and/or rows (shown in box 134). As shown in FIGS. 6A-C, engine 70 may further utilize a word association/search feature to access scope, tower, and/or secondary support responsibilities (shown collectively as columns 142A-N). For example, the terms "asset inventory" may be utilized to find associated requirements. As shown in FIGS. 7A-B, table 150 demonstrates that engine 70 may utilize color or other formatting (e.g., boldface, font size, underlining, italics, typeface, etc.) to show resulting string matches occurring during the scope, tower and/or requirements analyses. For example, engine 70 may utilize the color blue for scope attributes, the color red for tower attributes, and the color green for requirements. Referring now to FIG. 8, an additional table/worksheet 160 is depicted that includes various tabs 162A-C that each pertain to a particular table present in a statement of work. For example: tab 162A pertains to a table of storage classes; tab 162B pertains to a gold level storage service; and tab 162C pertains to a silver level storage service (it is understood that gold and silver levels storage services are illustrative terms only intended to indicate varying levels of service that a provider may make available). Table 160 allows a consolidated table to be maintained whereby a user may access particular types of data via tabs 162A-C. Along these lines, engine 70 may dynamically add, insert, and/or populate tabs 160A-C with any table tabs and/or figures/drawings found in the SOW.

As indicated above, engine 70 may generate a set of internal tables/worksheets that may be utilized based on the scope, tower and/or requirements analyses performed hereunder to provide the output/results described herein. FIGS. 9-13 depict examples of such tables. Referring first to FIGS. 9A-B, illustrative wormhole table 170 and non-wormhole table 180, respectively, is shown. In general, engine 70 automatically populates wormhole table 170 "wormhole" file attributes such as path, file name, and last updated date for all documents identified (e.g., via interface 100). Engine 70 populates non-wormhole table 180 with similar attributes for non-wormhole files. The internal tables 170 and 180 containing the list of wormhole files and non-wormhole files are referenced by document files search procedure occurring pursuant to scope, tower, and/or requirements analyses performed hereunder.

Figure 13:
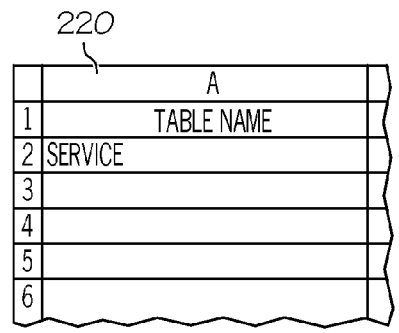
FIG. 13 depicts a tabs table worksheet according to an embodiment of the present invention.

Referring to FIG. 10, a scope table 190 is shown as generated pursuant to the scope analysis described above. In general, engine 70 may populate scope table 190 with the names of entities that might have scope assigned thereto. FIG. 11 depicts a tower table 200 (generated pursuant to the tower analysis described above) that engine 70 may populate with the names of service towers that might have engagement or delivery responsibilities assigned thereto. FIG. 12 depicts a requirements table 210 (generated pursuant to the requirements analysis described above) that engine 70 may populate with the names of service towers which might have engagement or delivery responsibilities assigned to them as secondary towers (e.g., as supplemental or backup towers to perform or deliver requested services). FIG. 13 depicts a tabs table 220 that engine 70 may populate with the names of each tab created within a workbook generated for a set of SOW documents being processed. The internal tables 190, 200, and 210 may be utilized hereunder for purposes of text string matching and comparison. Engine 70 may create tables 190, 200, and 210 after format conversion and utilize tables 190, 200, and 210 for the scope, tower and/or requirements analyses hereunder. The tab table 220 may be utilized by an administrator or the like for cleanup and removal of current content such as customizing table names to project specific or customer specific terminology.

Logical Flows

Figure 14:
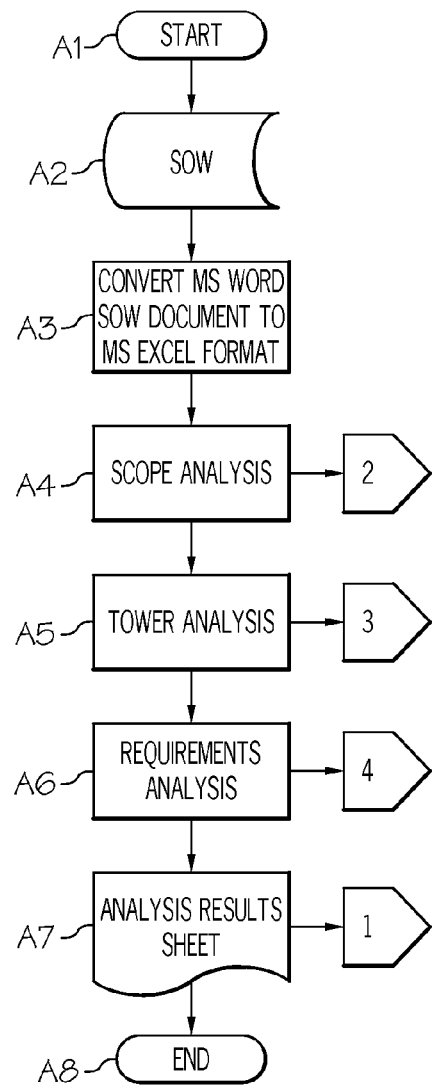
FIG. 14 depicts a flow diagram according to an embodiment of the present invention.

The teachings described hereinabove will now be further described in the context of the flow diagram of FIGS. 14-19. Referring first to FIG. 14, a main processing flow diagram is depicted. As shown, the process starts in step A1, and in step A2 engine 70 receives a SOW. In step A3, engine 70 converts SOW document from a first format to a second format (e.g., from MS Word format to MS Excel format). In step A4, engine 70 performs the scope analysis (i.e., the process flows to block "2," which is represented in FIGS. 16A-B). In step A5, engine 70 performs the tower analysis (i.e., the process flows to block "3," which is represented in FIGS. 18A-B). In step A6, engine 70 performs the requirements analysis (i.e., the process flows to block "4," which is represented in FIGS. 16A-B). In step A7, engine 70 provides a results sheet/report before the process ends in step A8.

Figure 15:
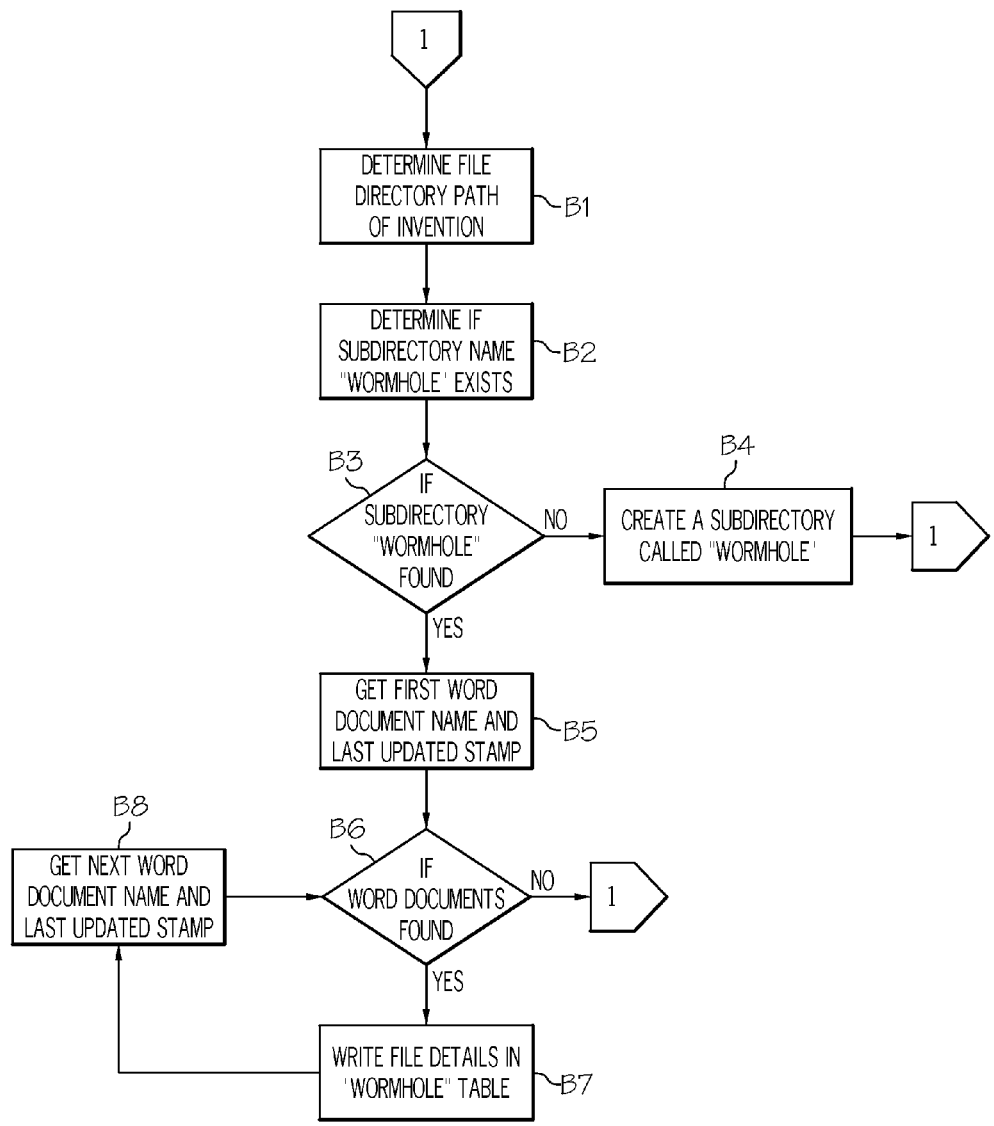
FIG. 15 depicts another flow diagram according to an embodiment of the present invention.
Figure 16A:
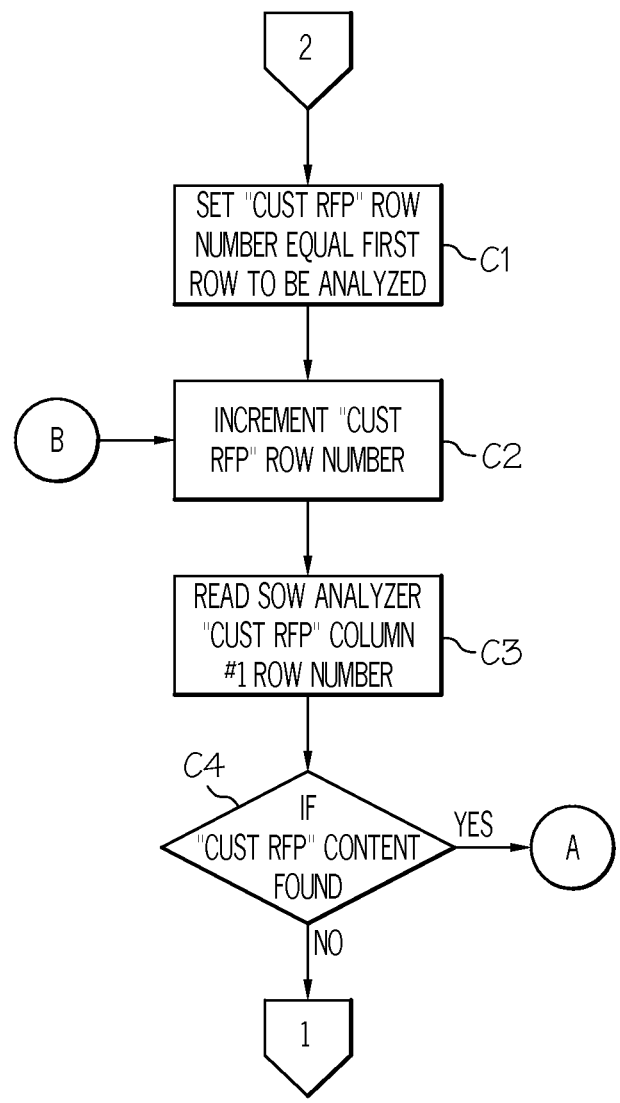
FIGS. 16A-B depict additional flow diagrams according to an embodiment of the present invention.
Figure 16B:
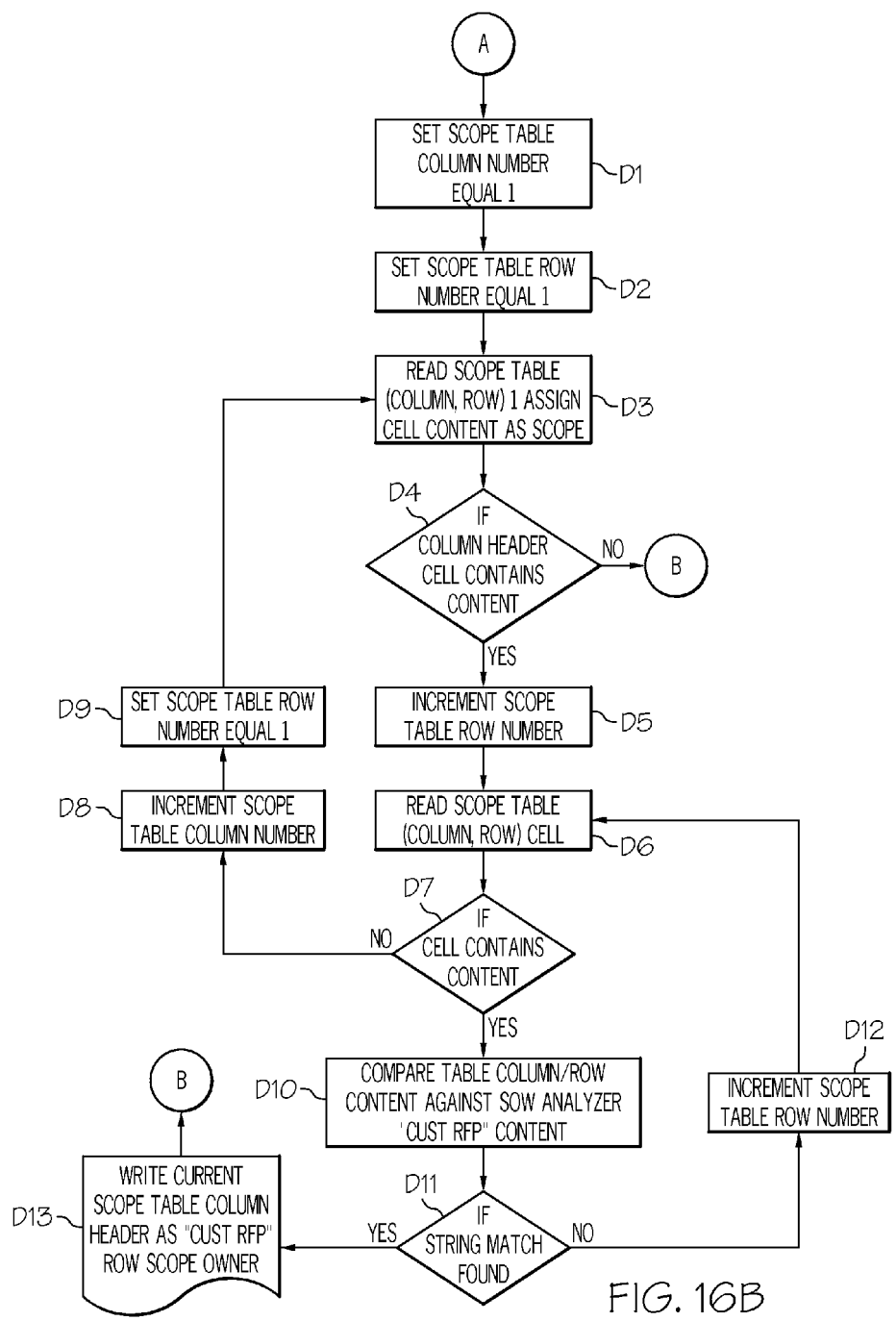

Referring now to FIG. 15, a flow diagram depicting the file search process according to an aspect of the present invention is shown. In general, the process may be from block 1 of FIG. 14. In step B1, engine 70 determines a file path directory. In step B2, engine 70 determines if a "wormhole" subdirectory exists. In step B3, engine 70 determines if such a sub directory is found. If not, engine 70 may create such a directory in step B4, and the process can return to FIG. 14 (e.g., within a directory associated with the SOW analysis). If a subdirectory does exist, engine 70 will attempt to obtain the first document's name (e.g., MS Word) and latest updated stamp in step B5. In step B6, engine 70 determines whether such a document does exist. If not, the process returns to FIG. 14 (e.g., step A1). If so, engine 70 may write file details (e.g., file path, file name, etc.) into the wormhole table (FIG. 5A) in step B7, and the next document name/stamp may be obtained in step B8.

Referring now to FIGS. 16A-B, the scope analysis process according to an aspect of the present invention is shown. In step C1, engine 70 will set a particular "Oust RFP" row number to a first row to be analyzed of a SOW table (post conversion). In step C2, engine 70 will increment the "Oust RFP" row number (e.g., by a counter). In step C3, engine 70 will read the "Oust RFP" column number. In step C4, engine 70 will determine whether "Oust RFP" information is found within the cell. If no, the process may return to FIG. 14. If so, the process may flow to FIG. 16B. In step D1, engine 70 will set the scope table column number equal to "1." In step D2, engine 70 will set the scope table row number equal to "1." In step D3, engine 70 will read the column/row number "1", and assign the cell content therein as the scope. In step D4, engine 70 will determine whether a column header cell contains content. If not, the process returns to step C2 of FIG. 16A. If so, engine 70 will increment the scope table row number in step D5, and in step D6, engine 70 will read the scope table (column, row). In step D7, engine 70 will determine if the cell contains content. If not, engine 70 will increment the scope table column number may be incremented in step D8, and engine 70 may set the scope table row number equal to "1" in step D9 and the process would return to step D3. If the cell did contain content in step D7, engine 70 will compare the table column/row content against the "Oust RFP" content in step D10. In step D11, engine 70 will determine whether a string match was found. If not, engine 70 will increment the scope table row number in step D12, and the process returns to step D6. If so, engine 70 will write current scope table column header as the "Oust RFP" row scope's owner and the flow may return to step C2 of FIG. 16A.

Figure 17A:
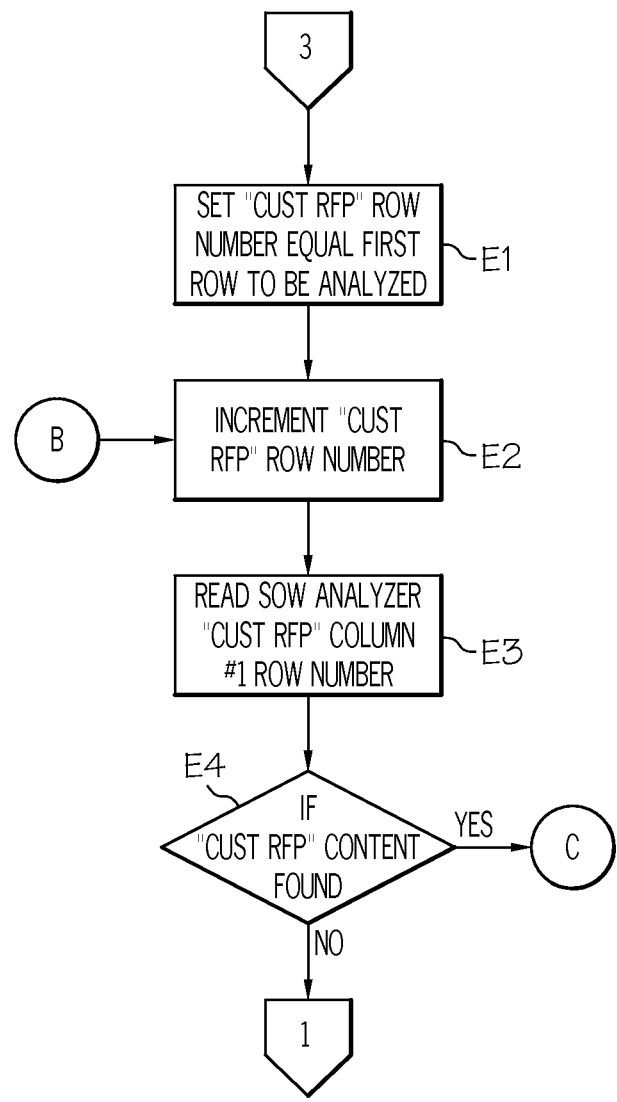
FIGS. 17A-B depict additional flow diagrams according to an embodiment of the present invention.
Figure 17B:
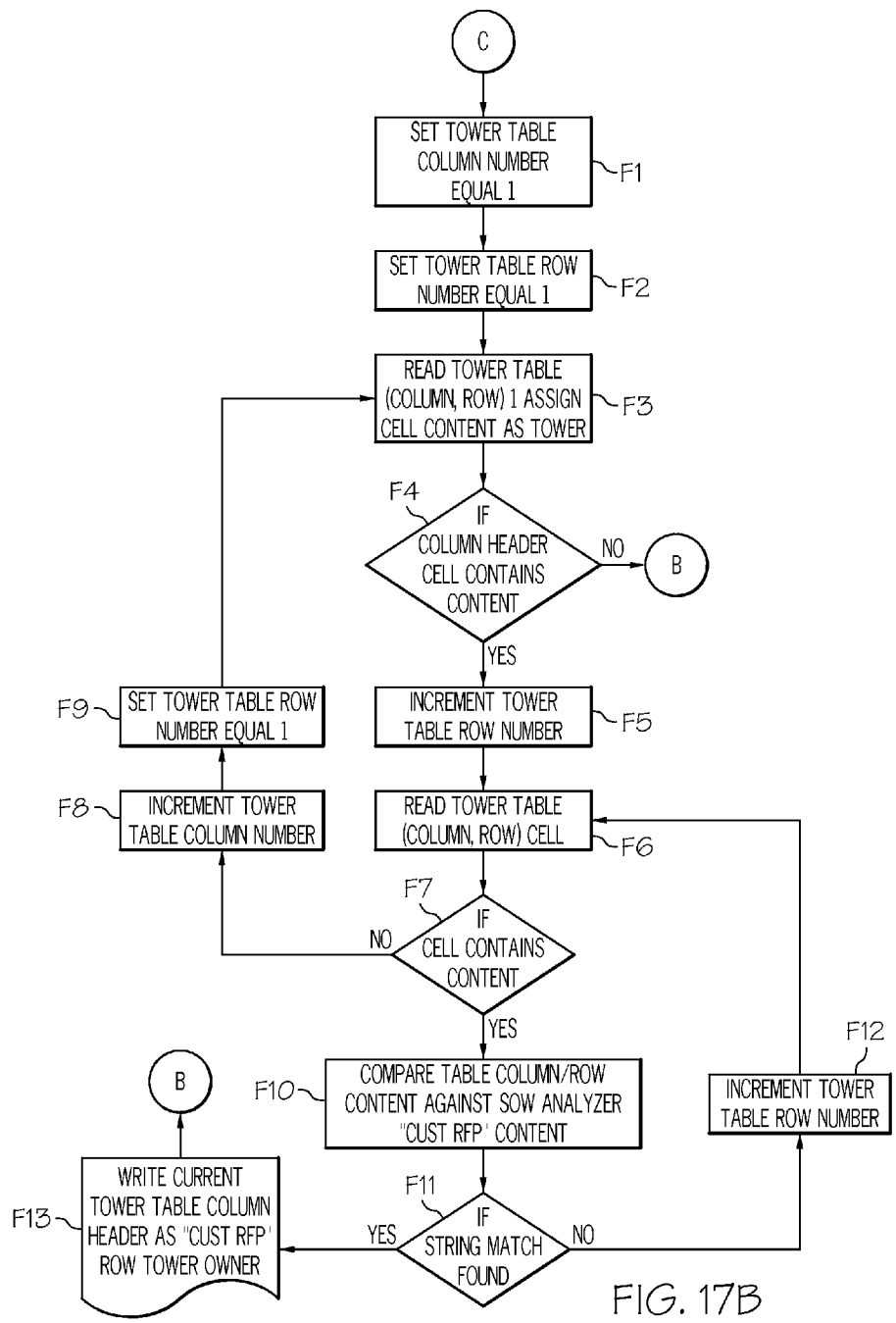
Figure 18A:
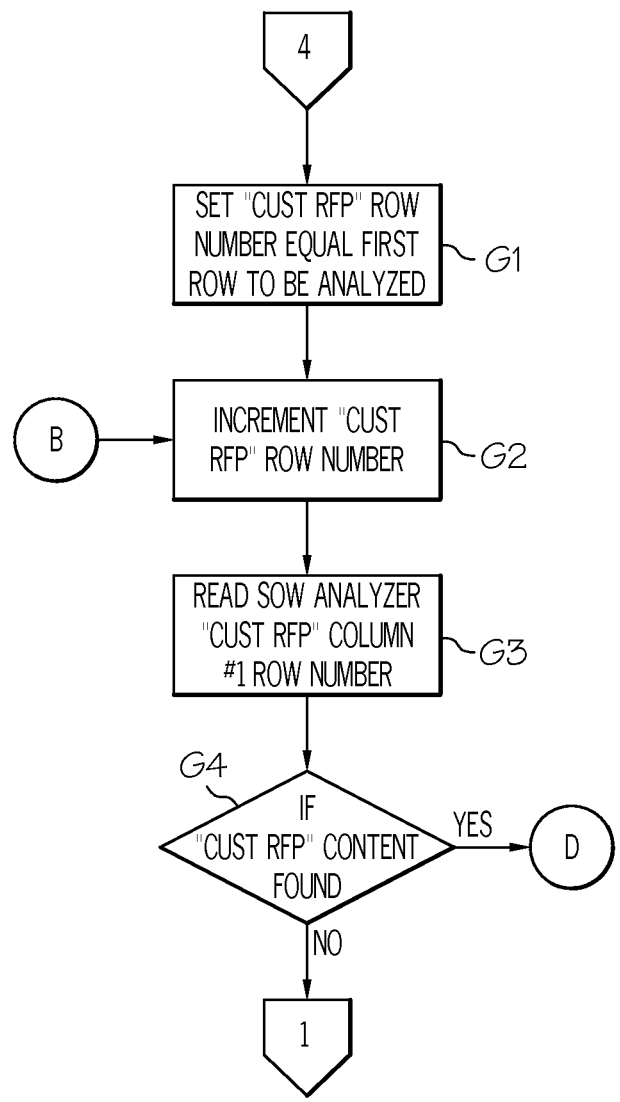
FIGS. 18A-B depict additional flow diagrams according to an embodiment of the present invention.
Figure 18B:
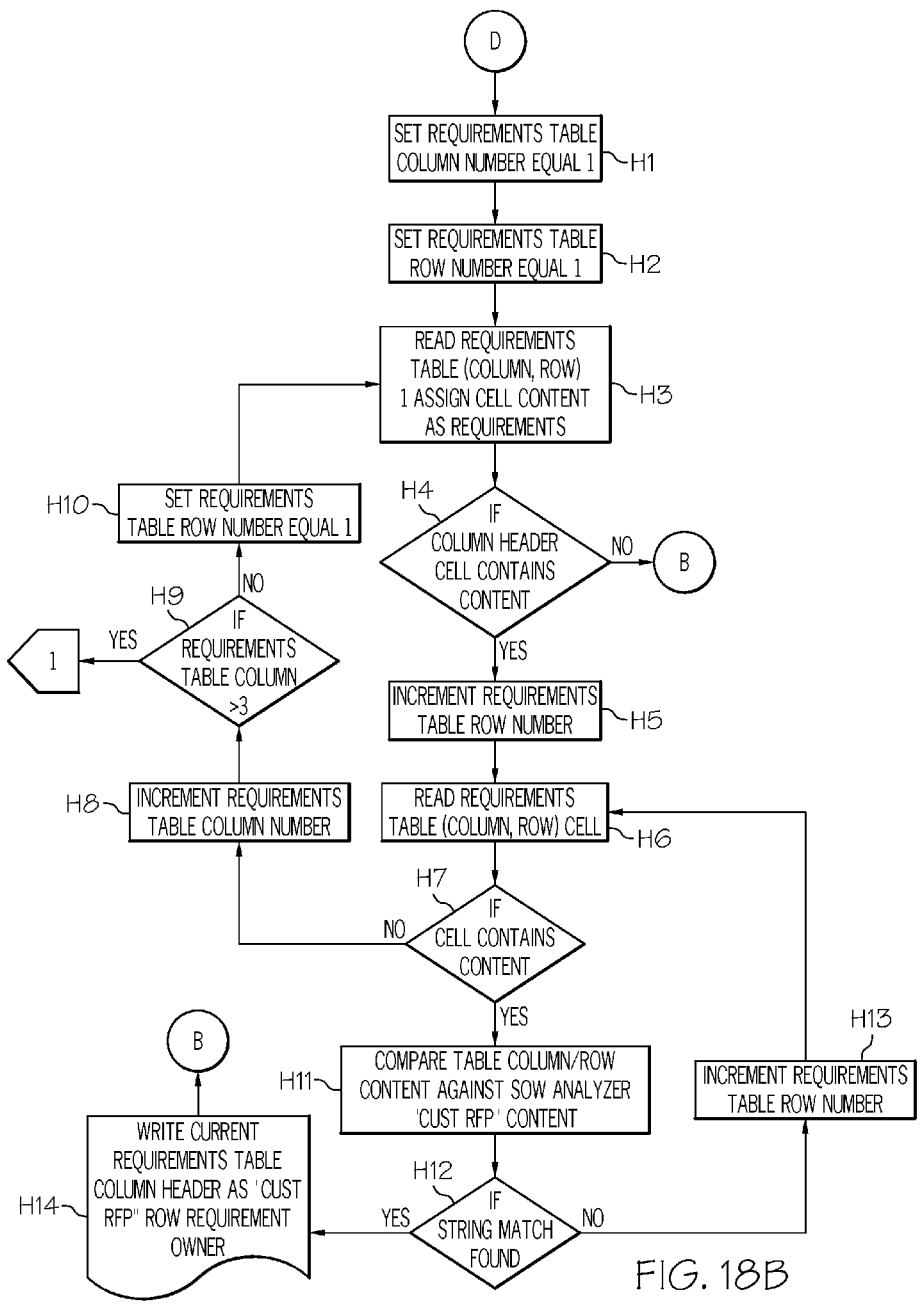

Referring now to FIGS. 17A-B, the tower analysis process according to an aspect of the present invention is shown. In step E1, engine 70 will set a particular "Oust RFP" row number equal to a first row of a tower analysis table to be analyzed. In step E2, engine 70 will increment the "Oust RFP" row number (e.g., by a counter). In step E3, engine 70 will read the "Oust RFP" column number. In step E4, engine 70 will determine determined whether "Oust RFP" information is in the table. If not, the process may return to FIG. 14. If so, the process may flow to FIG. 17B. In step F1, engine 70 will set the tower table column number may be set equal to "1." In step F2, engine 70 will set the tower table row number may be set equal to "1." In step F3, engine 70 will read the column/row number "1", and engine 70 will assign the cell content therein as the tower. In step F4, engine 70 will determine whether a column header cell contains content. If not, the process returns to step E2 of FIG. 17A. If so, engine 70 will increment the tower table row number in step F5, and in step F6, engine 70 will read the tower table (column, row) cell. In step F7, engine 70 will determine if the cell contains content. If not, engine 70 will increment the tower table column number in step F8, engine 70 will set the tower table row number equal to "1" in step F9, and the process would return to step F3. If the cell did contain content in step F7, engine 70 will compare the table column/row content against the "Oust RFP" content in step F10. In step F11, engine 70 will determine whether a string match was found. If not, engine 70 will increment tower table row number in step F12, and the process returns to step F6. If so, engine 70 will write the current tower table column header as the "Oust RFP" row tower's owner, and the process may return to step E2 of FIG. 17A.

Referring now to FIGS. 18A-B, the requirements analysis process according to an aspect of the present invention is shown. In step G1, engine 70 will set a particular "Oust RFP" row number may be set equal to a first row of a requirements table to be analyzed. In step G2, engine 70 will increment the "Oust RFP" row number (e.g., by a counter). In step G3, engine 70 will read the "Oust RFP" column number. In step G4, engine 70 will determine whether "Oust RFP" information is found. If not, the process may return to FIG. 14. If so, the process may flow to FIG. 18B. In step H1, engine 70 will set the requirements table column number equal to "1." In step H2, engine 70 will set the requirements table row number equal to "1." In step H3, engine 70 will read the column/row number "1", and engine 70 will assign the cell content therein as the requirements. In step H4, engine 70 will determine whether a column header cell contains content. If not, the process returns to step G2 of FIG. 18A. If so, engine 70 will increment the requirements table row number in step H5, and in step H6, engine 70 will read the requirements table (column, row) cell. In step H7, engine 70 will determine if the cell contains content. If not, engine 70 will increment the requirements table column number may be incremented in step H8, and engine 70 will determine whether the requirements table column is greater than "3" in Step H9 (or some other predetermined value). If so, the process may return to FIG. 14. If not, engine 70 will set the requirements table row number equal to "1" in step H10 and the process would return to step H3. If the cell did contain content in step H7, engine 70 will compare the table column/row content against the "Oust RFP" content in step H11. In step H12, engine 70 will determine whether a string match was found. If not, engine 70 will increment the requirements table row number in step H13, and the process returns to step H6. If so, engine 70 will write the current requirements table column header as the "Oust RFP" row requirements' owner in step H14 and the process may return to step G2 of FIG. 18A.

Figure 19:
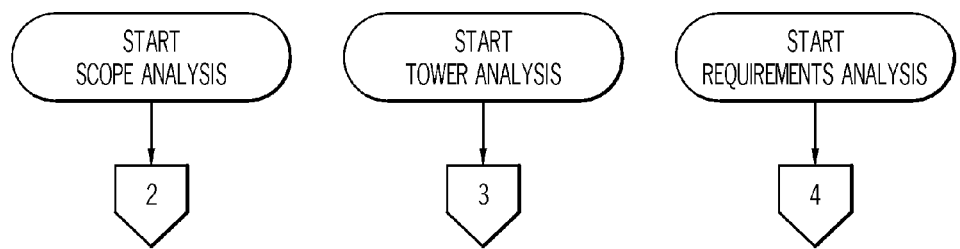
FIG. 19 depicts another flow diagram according to an embodiment of the present invention.

FIG. 19 demonstrates that the processes may be impendent from one another, and can be performed in parallel or in any order. Furthermore, the scope analysis (block 2), the tower analysis (block 3), and the requirements analysis (block 4) generally pertain to FIGS. 16A, 17A, and 18A, respectively.

Illustrative Example

In an illustrative (non-limiting example), assume that the overall process starts when a vendor receives an RFS or RFP including digitized potential client SOW and other related documents such as articles and exhibits in a Microsoft Word document format. Further assume that a user accesses a current release of the program 40/engine 70 and places it in a file directory folder on his or her computer system's internal disk. If the potential client SOW is in a compressed format (i.e., a zipped folder), then the user will need to extract (i.e., unzip) the package content into the directory folder. The user then performs a cursory review of the potential client-provided documents for the purpose of determining which documents will be processed. The user then starts Microsoft Excel and opens the downloaded material. The program/engine searches a subdirectory folder called "wormhole" of the directory folder in which the program/engine was downloaded and saved for any and all Word documents. Word documents found will have the name and extension of the document displayed in a settings panel window. The user may then select specific documents to be processed from the list of documents found in the local subdirectory and arrange the order of processing as needed. Once the user is satisfied with the documents selected and other settings selected on the settings panel, then the user clicks on the "Start" button to begin the automated processing (e.g., as shown in interface 100 of FIG. 3).

The program/engine then processes each document selected, automatically converting the document into a Microsoft Excel workbook format. During this process, the program/engine may display processing status information on a progress monitor pop-up panel during the processing period as shown in FIG. 4 above. Once the conversion and analysis processes are complete, the program/engine notifies the user through a pop-up message box that the processing has completed. After successful completion of the overall process, the user may then begin reviewing the invention's results worksheet shown in FIGS. 5-8. From here, the user may enter into an iterative process of making adjustments to the contents of the invention's internal tables and results worksheet for subsequent re-run or use the results toward resource participation assessment. Under such an embodiment, internal tables may serve as the input files that are designated by a user via mechanism 104 of interface 100 Anytime following the initial conversion and analyses process completion, and based on the user's best judgment, the user may leverage the output results in respect to his/her/it's engagement job role responsibilities, such as resource participation assessment.

While shown and described herein as a SOW analysis solution, it is understood that the invention further provides various alternative embodiments. For example, in one embodiment, the invention provides a computer-readable/useable medium that includes computer program code to enable a computer infrastructure to provide SOW analysis as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide SOW analysis functionality. In this case, the service provider can create, maintain, support, etc., a computer infrastructure, such as computer system/server 12 (FIG. 1) that performs the processes of the invention for one or more consumers. In return, the service provider can receive payment from the consumer (s) under a subscription and/or fee agreement and/or the service provider can receive payment from the sale of advertising content to one or more third parties.

In still another embodiment, the invention provides a computer-implemented method for SOW analysis. In this case, a computer infrastructure, such as computer system 12/server (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for analyzing statements of work (SOWs), the computer-implemented method comprising the steps of:

at least one computer converting a file from a first format into a second format, the file comprising a SOW of a potential client of a services delivery organization;

the at least one computer determining, using the converted file, a scope of at least one strategic outsourcing service being requested in the SOW by matching, in a parsing of the converted file, text strings in the converted file against a table of scope responsibility related terms and determining, for each matched scope responsibility related term, whether a scope responsibility is a service provider responsibility or a potential client responsibility;

the at least one computer determining, using the converted file, at least one service delivery tower of the services delivery organization that may have a responsibility for delivering the at least one strategic outsourcing service to the potential client by matching, in a parsing of the converted file, text strings in the converted file against a table of tower specific related terms to identify, for each paragraph in the converted file containing a tower specific related term, a particular service provider designated specialist group that is responsible, wherein paragraphs in the converted file having matched scope responsibility related terms identified as having potential client responsibility are ignored;

the at least one computer determining, using the converted file, a set of requirements for the at least one service delivery tower to deliver the at least one strategic outsourcing service by matching, in a parsing of the converted file, text strings in the converted file against a table of requirements-specific related terms to identify, for each paragraph in the converted file containing a requirements-specific related term, a particular ancillary service task that is necessary, wherein paragraphs in the converted file having matched scope responsibility related terms identified as having potential client responsibility are ignored; and the at least one computer generating a report identifying at least one of: the scope, the at least one service delivery tower, and the set of requirements.

2. The computer-implemented method of claim 1, the first format being a document format, and the second format being a spreadsheet format.

3. The computer-implemented method of claim 1, the at least one computer analyzing the file section by section to perform the conversion from the first format to the second format.

4. The computer-implemented method of claim 1, the at least one computer determining, based on the scope and the requirements, a best match between a set of services offered via the at least one service delivery tower and the SOW.

5. The computer-implemented method of claim 4, the report further identifying the set of services.

6. The computer-implemented method of claim 1, the report comprising a worksheet.

7. The computer-implemented method of claim 1, the at least one service delivery tower comprising at least one group of the services delivery organization.

8. A system for analyzing statements of work (SOWs), the system comprising:

a bus;

a non-transitory computer-readable storage device coupled to the bus;

a processor coupled to the bus;

program instructions, stored on the computer-readable storage device for execution by the processor, to convert a file from a first format into a second format, the file comprising a SOW of a potential client of a services delivery organization;

program instructions, stored on the computer-readable storage device for execution by the processor, to determine, using the converted file, a scope of at least one strategic outsourcing service being requested in the SOW by matching, in a parsing of the converted file, text strings in the converted file against a table of scope responsibility related terms and determining, for each matched scope responsibility related term, whether a scope responsibility is a service provider responsibility or a potential client responsibility;

program instructions, stored on the computer-readable storage device for execution by the processor, to determine, using the converted file, at least one service delivery tower of the services delivery organization that may have a responsibility for delivering the at least one strategic outsourcing service to the potential client by matching, in a parsing of the converted file, text strings in the converted file against a table of tower specific related terms to identify, for each paragraph in the converted file containing a tower specific related term, a particular service provider designated specialist group that is responsible, wherein paragraphs in the converted file having matched scope responsibility related terms identified as having potential client responsibility are ignored;

program instructions, stored on the computer-readable storage device for execution by the processor, to determine, using the converted file, a set of requirements for the at least one service delivery tower to deliver the at least one strategic outsourcing service by matching, in a parsing of the converted file, text strings in the converted file against a table of requirements-specific related terms to identify, for each paragraph in the converted file containing a requirements-specific related term, a particular ancillary service task that is necessary, wherein paragraphs in the converted file having matched scope responsibility related terms identified as having potential client responsibility are ignored; and program instructions, stored on the computer-readable storage device for execution by the processor, to generate a report identifying at least one of: the scope, the at least one service delivery tower, and the set of requirements.

9. The system of claim 8, the first format being a document format, and the second format being a spreadsheet format.

10. The system of claim 8, further comprising program instructions, stored on the computer-readable storage device for execution by the processor, to analyze the file section by section to perform the conversion from the first format to the second format.

11. The system of claim 8, further comprising program instructions, stored on the computer-readable storage device for execution by the processor, to determine, based on the scope and the requirements, a best match between a set of services offered via the at least one service delivery tower and the SOW.

12. The system of claim 11, the report further identifying the set of services.

13. The system of claim 8, the report comprising a worksheet.

14. The system of claim 8, the at least one service delivery tower comprising at least one group within the services delivery organization.

15. A computer program product for analyzing statements of work (SOWs), the computer program product comprising:

a non-transitory computer-readable storage device;

program instructions, stored on the computer-readable storage device for execution by a processor, to convert a file from a first format into a second format, the file comprising a SOW of a potential client of a services delivery organization;

program instructions, stored on the computer-readable storage device for execution by the processor, to determine, using the converted file, a scope of at least one strategic outsourcing service being requested in the SOW by matching, in a parsing of the converted file, text strings in the converted file against a table of scope responsibility related terms and determining, for each matched scope responsibility related term, whether a scope responsibility is a service provider responsibility or a potential client responsibility;

program instructions, stored on the computer-readable storage device for execution by the processor, to determine, using the converted file, at least one service delivery tower of the services delivery organization that may have a responsibility for delivering the at least one strategic outsourcing service to the potential client by matching, in a parsing of the converted file, text strings in the converted file against a table of tower specific related terms to identify, for each paragraph in the converted file containing a tower specific related term, a particular service provider designated specialist group that is responsible, wherein paragraphs in the converted file having matched scope responsibility related terms identified as having potential client responsibility are ignored;

program instructions, stored on the computer-readable storage device for execution by the processor, to determine, using the converted file, a set of requirements for the at least one service delivery tower to deliver the at least one strategic outsourcing service by matching, in a parsing of the converted file, text strings in the converted file against a table of requirements-specific related terms to identify, for each paragraph in the converted file containing a requirements-specific related term, a particular ancillary service task that is necessary, wherein paragraphs in the converted file having matched scope responsibility related terms identified as having potential client responsibility are ignored; and program instructions, stored on the computer-readable storage device for execution by the processor, to generate a report identifying at least one of: the scope, the at least one service delivery tower, and the set of requirements.

16. The computer program product of claim 15, the first format being a document format, and the second format being a spreadsheet format.

17. The computer program product of claim 15, further comprising program instructions, stored on the computer-readable storage device for execution by the processor, to analyze the file section by section to perform the conversion from the first format to the second format.

18. The computer program product of claim 15, further comprising program instructions, stored on the computer-readable storage device for execution by the processor, to determine, based on the scope and the requirements, a best match between a set of services offered via the at least one service delivery tower and the SOW.

19. The computer program product of claim 18, the report further identifying the set of services.

20. The computer program product of claim 15, the report comprising a worksheet.

21. The computer program product of claim 15, the at least one service delivery tower comprising at least one group within the services delivery organization.

* * * * *